United States Patent
Shu et al.

(10) Patent No.: US 12,017,959 B2
(45) Date of Patent: Jun. 25, 2024

(54) AMPHIPATHIC MULTIFUNCTIONAL HYBRID NANOPARTICLE, AND PREPARATION METHOD THEREFOR AND APPLICATION THEREOF

(71) Applicants: SOBUTE NEW MATERIALS CO., LTD., Nanjing (CN); NANJING BOTE NEW MATERIALS CO., LTD., Nanjing (CN); BOTE NEW MATERIALS TAIZHOU JIANGYAN CO., LTD., Taizhou (CN)

(72) Inventors: Xin Shu, Nanjing (CN); Qianping Ran, Nanjing (CN); Yong Yang, Nanjing (CN); Xiumei Wang, Nanjing (CN); Jinzhi Liu, Nanjing (CN); Jiangang Zhang, Nanjing (CN); Hongxia Zhao, Nanjing (CN)

(73) Assignees: SOBUTE NEW MATERIALS CO., LTD., Nanjing (CN); NANJING BOTE NEW MATERIALS CO., LTD., Nanjing (CN); BOTE NEW MATERIALS TAIZHOU JIANGYAN CO., LTD., Taizhou (CN)

( * ) Notice: Subject to any disclaimer, the term of this patent is extended or adjusted under 35 U.S.C. 154(b) by 878 days.

(21) Appl. No.: 17/044,292

(22) PCT Filed: Mar. 8, 2019

(86) PCT No.: PCT/CN2019/077457
§ 371 (c)(1),
(2) Date: Sep. 30, 2020

(87) PCT Pub. No.: WO2019/144973
PCT Pub. Date: Aug. 1, 2019

(65) Prior Publication Data
US 2021/0155542 A1 May 27, 2021

(30) Foreign Application Priority Data

May 29, 2018 (CN) .......................... 201810529704.6

(51) Int. Cl.
*C04B 28/04* (2006.01)
*C04B 14/06* (2006.01)
(Continued)

(52) U.S. Cl.
CPC .............. *C04B 28/04* (2013.01); *C04B 14/06* (2013.01); *C04B 20/1051* (2013.01);
(Continued)

(58) Field of Classification Search
CPC ..... C08F 292/00; C08K 9/04–08; C09C 1/30; C09C 1/3081; C09C 3/12
See application file for complete search history.

(56) References Cited

U.S. PATENT DOCUMENTS

2002/0128336 A1* 9/2002 Kolb .................... C09J 11/04
521/50

FOREIGN PATENT DOCUMENTS

| CN | 103864340 | 6/2014 |
| CN | 103922638 | 7/2014 |

(Continued)

OTHER PUBLICATIONS

Machine translation of CN-105713125-A obtained from IP.com (Year: 2016).*

*Primary Examiner* — Kregg T Brooks
*Assistant Examiner* — David R. Foss
(74) *Attorney, Agent, or Firm* — Treasure IP Group, LLC

(57) ABSTRACT

Disclosed is an amphiphilic multifunctional hybrid nanoparticle. The nanoparticle of the present invention has a detachable hydrophilic organic polymer with both a water-soluble long chain and a hydrophobic long hydrocarbon functional (Continued)

group attached to the surface, wherein the body of the nanoparticle is a silica or an organofunctional group substituted silica or an organofunctional group substituted silicon-oxygen bond network, and the nanoparticle contains a free organosiloxane with hydrophobic long hydrocarbon functional groups and a fatty acid or fatty acid ester or aluminum complex of fatty acid with hydrophobic long hydrocarbon functional groups. The nanoparticle can reduce the water permeability of the cement-based material; the cement-based material has the internal hydration products and interfaces are hydrophobized, further reducing the possibility that the harmful particles erode the cement-based material through moisture penetration; furthermore, Si—Al oxides participate is beneficial to the improvement of its mechanical properties.

5 Claims, 1 Drawing Sheet

(51) Int. Cl.
*C04B 20/10* (2006.01)
*C04B 28/02* (2006.01)
*C04B 40/00* (2006.01)
*C08F 292/00* (2006.01)
*C08K 9/04* (2006.01)
*C08K 9/06* (2006.01)
*C08K 9/08* (2006.01)
*C09C 1/30* (2006.01)
*C09C 3/12* (2006.01)

(52) U.S. Cl.
CPC .......... *C04B 28/02* (2013.01); *C04B 40/0028* (2013.01); *C09C 1/3081* (2013.01); *C01P 2004/61* (2013.01); *C08F 292/00* (2013.01); *C08K 9/04* (2013.01); *C08K 9/06* (2013.01); *C08K 9/08* (2013.01); *C09C 1/30* (2013.01); *C09C 3/12* (2013.01)

(56) References Cited

FOREIGN PATENT DOCUMENTS

| | | | |
|---|---|---|---|
| CN | 105348457 A | | 2/2016 |
| CN | 105693927 A | | 6/2016 |
| CN | 105713125 A | * | 6/2016 ........... C04B 18/022 |
| CN | 108752540 A | | 11/2018 |

* cited by examiner

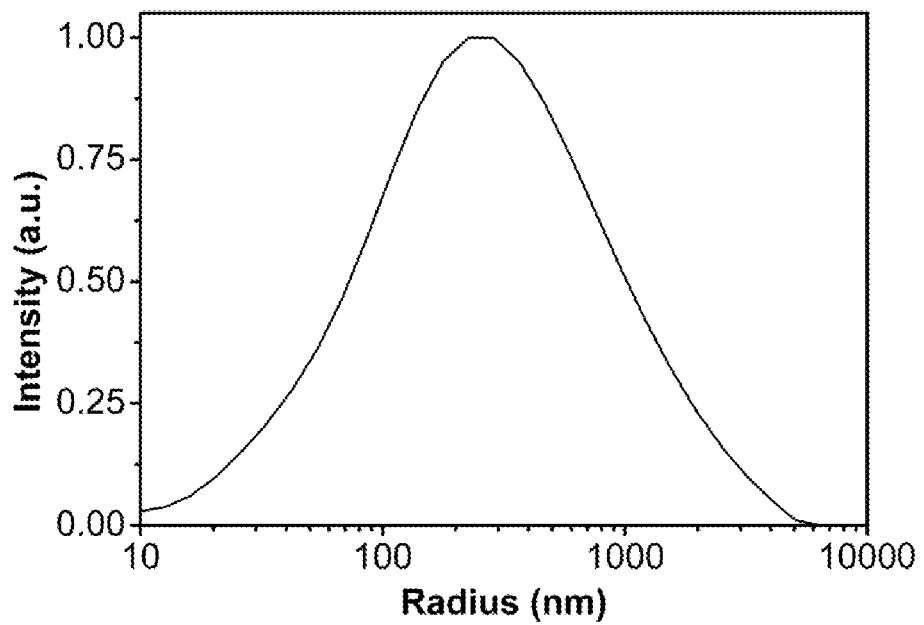

AMPHIPATHIC MULTIFUNCTIONAL HYBRID NANOPARTICLE, AND PREPARATION METHOD THEREFOR AND APPLICATION THEREOF

CROSS REFERENCE TO RELATED APPLICATION

This application claims priority to a PCT application PCT/CN2019/077457 filed on Mar. 8, 2019, which in turn claims priority to a Chinese Application No. 201810529704.6, filed on May 29, 2018. The PCT and Chinese Applications are incorporated herein by reference in their entireties.

BACKGROUND OF THE INVENTION

Technical Field

The present invention belongs to the field of cement-based material admixtures, and particularly relates to a hybrid particle used for improving the permeability resistance and mechanical properties of cement-based materials and a preparation method thereof.

Description of Related Art

The term "concrete" as used herein generally indiscriminately refers to concrete such as mortar or grout, which is also applicable elsewhere herein.

Concrete is a porous material with a pore size in the nanometer to millimeter range. These pores, especially interconnected pores, are the key factors for the intrusion of harmful materials to cause erosion (freeze thawing, carbonization, chemical attack, alkali-aggregate reaction, steel-bar corrosion, etc.) of a concrete structure. Various harmful substances (such as chloride ions and sulfate ions) are adsorbed to the surface layer of concrete by the capillary action of an aqueous solution, and further penetrate into the concrete, which brings serious rust damage to a reinforced concrete structure. It is an important way to improve the durability of the concrete by performing waterproofing treatment on concrete or adding various water repellents in preparation of concrete to weaken moisture permeability and compact the pore structure of the concrete.

The permeability of the concrete may be improved by carrying out surface treatment on the concrete. At present, commonly used organic surface treatment agents and hydrophobic impregnating coatings include silanes and siloxanes, epoxy resins, polyurethanes, acrylates, polystyrene resins, and neoprene. The organic surface treatment agents have strong water repellency and can penetrate into the concrete, block the pores and form a hydrophobic film on the pore walls of the concrete. However, organic coatings affect the permeability of concrete and have a short protective life. Moreover, organic surface treatment agents have poor fire resistance and are easy to age. Under high temperature and ultraviolet irradiation, the effect of the organic surface treatment agents will be significantly reduced, cracks or peeling will occur, and it is difficult to clean them away from the building after the organic surface treatment agents lose their effects. Although an acrylic acid treatment agent can significantly reduce the water permeability of concrete, it has poor resistance to chloride ion penetration and is therefore not suitable for use in marine engineering. Compared with these treatment agents, inorganic surface treatment agents (prepared by adding various pigments, fillers, additives and curing agents to water glass series, phosphate series and cement-based series) have better anti-aging properties. The inorganic surface treatment agents can penetrate into the concrete and undergo complex physical and chemical reactions with the hydration product of cement to generate new substances to block the capillary pores, so as to prevent corrosive media in the external environment from entering the concrete for a long time, protect the concrete and steel bars from erosion, and improve the durability of a reinforced concrete structure. However, they do not fundamentally change the hydrophilic properties of concrete, so their waterproof effect is limited, and their performance is inferior to that of organic hydrophobic coatings. In addition, surface treatment with sodium silicate or the like can increase the alkalinity of the concrete and may increase the probability of alkali-aggregate reaction. When a permeable water repellent is used in surface waterproofing treatment of concrete, the penetration depth of the water repellent is very limited, and its waterproof effect is not ideal in some special cases. When the concrete has cracks, the protective layer loses its effectiveness, and harmful substances still infiltrate into the concrete along the cracks to cause erosion.

In order to fundamentally improve the permeability of water and harmful substances in concrete, it is necessary to use internal blending materials to change the microscopic interface properties of concrete. A nano-micron material reacts with alkaline components of concrete to compact a matrix and this is an effective method to refine pore distribution and improve the permeability. Silica ash, fly ash, nano aluminium oxide and iron oxide can be used to effectively improve the permeability of chloride ion and reduce electric flux. However, nano-materials are also prone to agglomeration, which greatly affects the workability of the cement-based materials, and limits the performance of the materials. In addition, these materials are less effective in waterproofing performance than hydrophobic water repellents. The use of hydrophobic silanes or fatty acids to make their microscopic interfaces, especially pore interfaces, completely hydrophobic, is an important means to reduce the water permeability of concrete.

Since the hydrophobic silane itself is hardly soluble in water, it needs to be prepared into an emulsion by using an organic solvent or an emulsifier system. The organic solvent has VOC contamination, and the emulsifier system is stable for a certain period of time, but may have particle agglomeration due to the process of Ostwald Ripening after the long-time placement, thus causing performance deterioration. Especially when added to a solution environment with high alkali and high salt in concrete, the structure of the emulsion is easily destroyed, resulting in the leakage of water-repellent components enclosed therein and the agglomeration and floating of the water-repellent components; siloxane is rapidly hydrolyzed in an alkaline environment and attached to hydration products and may be buried by early hydration products, thereby impairing its application performance. If alkoxysilane is used as a hydrophobic component, it will react with water and release small molecular alcohols, causing the emulsion to aggregate and lose stability (see Patent CN1183060C). Moreover, the use of an emulsifier (surfactant) has a great influence on the workability of concrete. In application of concrete, it is necessary to additionally use air entraining, defoaming and thickening components to adjust its workability, which causes a trouble for its use (CN103864340B and CN103922638B). Although silicone waterproof emulsions prepared by foreign giants such as Wacker and Degussa, have good performance, they are expensive and not conducive to promotion. The preparation of a hydrophobic silane into a polymer emulsion is an effective solution for improving stability (CN103864340B and CN103922638B); however, as compared to the organic small molecules that can freely migrate, the polymer particles have a limited surface area, and occupy a limited area when absorbed to the pore interface of the concrete. Furthermore, the use of reactive emulsifiers (containing sulfonic group) makes the surface of the nanoparticles hydrophilic, which is obviously disadvantageous for enhancing the hydrophobicity of the interface and improving the waterproofness.

Fatty acid water repellents can be classified into two types: soluble metal soap water repellents and asphaltene metal soap water repellents. The soluble metal soap water repellents are prepared by mixing, heating and saponifying stearic acid, palmitic acid, rosin acid, a sodium hydroxide solution, potassium hydroxide (or potassium carbonate) and water in a certain ratio. High-level saturated and unsaturated organic acids (RCOOH) and aqueous solutions of their alkali metals are hydrophobic surfactants. These water repellents are colored pastes and mixed with cement mortar or concrete, and their carboxylic acid groups interact with calcium hydroxide in cement grout to form an adsorption layer of insoluble calcium soap; long-chain alkyl groups form a hydrophobic adsorption layer and insoluble substances between the surface of concrete surface and aggregate, which functions to fill minute pores and block capillary passages. According to the study by the inventors, fatty acid water repellents, when added to cement-based materials, also limit their solubility due to the rapid formation of insoluble species such as fatty acid calcium, and the agglomeration of fatty acid salts may form defects in concrete on one hand; on the other hand, their performance is limited at low dosages due to limited surface area.

In short, these two types of organic water repellents can not gradually act on the microscopic interface of cement hydration products in the hydration reaction in a single-molecule dispersion form in cement-based materials. Moreover, these water repellents with low density tend to migrate freely and be enriched within a few millimeters at the upper layer of the cement-based materials (Study on the Waterproofing and Anti-erosion Effect of Chloride Ion for Integral Water Repellent Concrete, 2010, Master's thesis of Qingdao University of Technology). Below this depth, the content of hydrophobic components in the concrete is limited, and thus the improvement in the permeability resistance of the concrete is very limited. The more effective dosage is usually not less than 1% of the mass of the cementing material. However, under this dosage condition, these water repellents can significantly affect the strength of concrete. For example, as disclosed by Tang Ming et al. (Liaoning Building Materials, 2002 (1)), the strength of the waterproof layer is reduced by at least 26% for ordinary fatty acid salt water repellents.

The traditional impermeable materials not only affect the permeability of concrete and have a short protective life. Moreover, organic surface treatment agents have poor fire resistance and are easy to age. Under high temperature and ultraviolet irradiation, the effect of the organic surface treatment agents will be significantly reduced, cracks or peeling will occur, it is difficult to clean them away from the building after failure, and the waterproof effect is not ideal. When the concrete has cracks, the protective layer loses its effectiveness, and harmful substances still infiltrate into the concrete along the cracks to cause erosion. However, nanomaterials are also prone to agglomeration, which greatly affects the workability of the cement-based materials, and limits the performance of the materials. In addition, these materials are less effective in waterproofness than hydrophobic water repellents. The emulsifier system is stable for a certain period of time, but may have particle agglomeration due to the process of Ostwald Ripening after the long-time placement, thus causing performance deterioration. In addition, the emulsifier system is expensive, which is not conducive to promotion. Fatty acid water repellents, when added to cement-based materials, also limit their solubility due to the rapid formation of insoluble species such as fatty acid calcium, and the agglomeration of fatty acid salts may form defects in concrete on one hand; on the other hand, their performance is limited at low dosages due to limited surface area. The water repellents freely migrate and are enriched at the upper layer of cement-based materials.

BRIEF SUMMARY OF THE INVENTION

In order to solve the defects of traditional impermeable materials which are difficult to use, or have limited impermeability, or are easy to fail, or high in cost, or disadvantageous to the mechanical properties of cement-based materials, the present invention designs an amphiphilic hybrid nanoparticle by combining the advantages of nano-micron materials in improving the pore structure and enhancing the mechanical properties of cement-based materials with the advantage of hydrophobic materials in reducing water permeability. In the amphiphilic hybrid nanoparticle, a hydrophilic long chain takes a stabilizing effect to cause nanoparticles to be fully and stably dispersed during storage and application. In a strong alkaline environment, the hydrophilic long chain gradually falls off, and the surface of the nanoparticles is occupied by the hydrophobic component, so that its surface becomes hydrophobic, and the water permeability at the particle interface is reduced.

The nanoparticle itself is a silicon-oxygen bond network containing hydrophobic organic molecules, and the silicon-oxygen bond network acts as a soft skeleton or capsule. In the strong alkaline environment of a cement-based material, It thins or ruptures by reacting with $Ca(OH)_2$. Hydrophobic molecules at the inner layer are gradually released, and the hydrophobic molecules themselves gradually release a hydrophobic water repellent in the alkaline environment (by hydrolysis) to be attached to the surface of the hydration product, so that the concrete pores are fully covered to be a completely hydrophobic interface, preventing harmful species from causing erosion by the dissolution in an aqueous phase solution and penetration.

The nanoparticle silicon-oxygen bond network reacts with $Ca(OH)_2$ to refine the pore structure to compact the matrix, improve the mechanical properties, and at the same time improve the impermeability.

The present invention provides an amphiphilic multifunctional hybrid nanoparticle having a detachable hydrophilic organic polymer with both a water-soluble long chain and a hydrophobic long hydrocarbon functional group attached to the surface. The body of the nanoparticle is a silica or an organofunctional group substituted silicon dioxide or an organofunctional group substituted silicon-oxygen bond network, and the nanoparticle contains a free organosiloxane with hydrophobic long hydrocarbon functional groups and a fatty acid or fatty acid ester or fatty acid aluminum complex with hydrophobic long hydrocarbon functional groups; the nanoparticle has an average diameter of not more than 1000 nm.

A preparation method of the amphiphilic multifunctional hybrid nanoparticle according to the present invention specifically comprises the following steps:

(1) adding water, a first batch of a polymerizable monomer A, a first batch of a non-radical polymerizable siloxane C having hydrophobic hydrocarbon functional groups, and a first batch of a siloxane or organofunctional group substituted siloxane D to a reactor, stirring for fully mixing, adjusting the pH of the mixed solution to 2-10, introducing $N_2$ to the mixed solution to remove $O_2$, and adjusting the temperature of the reaction system to 0-70° C.;

(2) immediately adding an aqueous solution of an initiator to the mixed solution prepared in step (1) or separately adding an initiator and water to initiate polymerization and also uniformly dropwise adding a polymerizable siloxane B, a second batch of the siloxane or organofunctional group substituted siloxane D, a second batch of the non-radical polymerizable siloxane C having hydrophobic hydrocarbon functional groups, and a second batch of the polymerizable monomer A, and reacting for 1-6 hours; and (3) adding a third batch of non-radical polymerizable siloxane C having a hydrophobic long chain and an organic component E to the mixed solution obtained after reaction in step (2), further stirring for 0.5-3 hours, returning the reaction system to room temperature, and adjusting the pH of the mixed solution to 7, thus obtaining a dispersion of the amphiphilic multifunctional hybrid nanoparticle.

wherein the polymerizable monomer A has a double bond at one end to participate in a radical polymerization reaction, and also has a water-soluble long chain at the other end, and the polymerizable monomer A is one of or any combination of more than one of structures represented by the following formula (1) and formula (2),

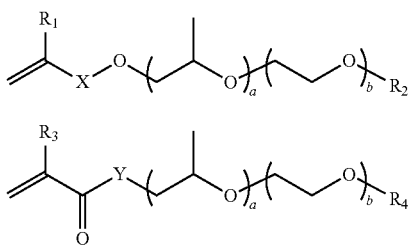

where $R_1$, $R_2$, $R_3$ and $R_4$ each independently represent H or $CH_3$, X represents $-OCH_2CH_2-$, $-OCH_2CH_2CH_2CH_2-$, or saturated alkyl with 1 to 4 carbon atoms, and Y represents $-NH-$ or $-O-$; the structures represented by the formula (1) and formula (2) do not limit the order of connection of ethoxy and isopropoxy, and the two units are segmentally distributed block structures in a side chain, or are statistically distributed random structures; a and b represent the average molar adduct numbers of ethoxy and isopropoxy in the side chain, respectively, the value of (a+b) ranges from 8 to 114 (8 and 114 are included), and the value of a/(a+b) is not more than ⅓.

The polymerizable monomer A plays a role in the reaction to stabilize the nanoparticle by steric hindrance during the preparation of the nanoparticle and at the initial stage after the addition to the cement-based material, and also participates in the formation of a micelle- or latex particle-like structure as a hydrophilic end of the polymer particles in the initial stage of the polymerization reaction, thereby ensuring that the subsequently added hydrophobic siloxane or monomer can react in the "micelle" or "latex particle" structure. If the value of (a+b) is too small, the stabilizing effect is weak, and agglomeration may occur during the polymerization process and when added to the cement-based material; and if the value of (a+b) is too large, the formation of primary polymer particles will take a long time and it is even difficult to form primary polymer particles due to long-chain hydrophilicity. Limiting the value of a/(a+b) to not more than ⅓ is also to control the structure so that the hydrophobicity is not too strong, and its conformation is sufficiently stretched to exert a stabilizing effect.

The polymerizable siloxane B is any one of or a mixture of more than one of methacryloxypropyltrimethoxysilane (MAPTMS), methacryloxypropyltriethoxysilane (MATTES), methacryloxymethyltriethoxysilane (AAPTMS), acryloyloxymethyltrimethoxysilane (AAMTMS), and acryloxypropyltrimethoxysilane (AAPTMS).

The polymerizable siloxane B is connected to the polymerizable monomer A by free radical polymerization on one hand, and connected to the hybridized nanoparticle by siloxane hydrolysis on the other hand, and the structure has the ester bond so that the nanoparticle is more stable under the preparation and storage conditions, and after the nanoparticle is added to the cement-based material, the ester bond will be gradually hydrolyzed in the strong alkaline environment so that the hydrophilic functional groups (mainly from the long chain of the polymerizable monomer A) on the surface of the nanoparticle originally acting as a stabilizer are gradually detached from the surface of the silica, and finally only the silicon hydroxy group and the long aliphatic chain are left on the surface of the silica nanoparticle, thus making its surface hydrophobic.

It should be noted that a stable dispersion of the nanoparticle with an amphiphilic surface can also be prepared by using vinyl siloxane small molecules. However, after being added to a cement-based material, the hydrophilic long side chain structure (polymerized by A and B) which exerts a stabilizing effect on the surface of the particle cannot be gradually removed, and the structure will eventually remain on the hydration product, so that the final pore structure of the cement-based material shows hydrophilicity, which weakens the water permeability resistance of the material itself.

The non-radical polymerizable siloxane C having hydrophobic hydrocarbon functional groups is one of or any combination of more than one of siloxanes having a structure of the following formula (3),

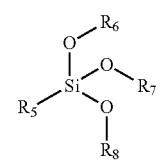

where $R_5$ represents a hydrocarbon functional group with 4 to 22 carbon atoms, $R_6$, $R_7$ and $R_8$ each independently represent saturated alkyl with 1 to 4 carbon atoms, and $R_5$, as a source of hydrophobicity of the particle, needs to ensure a sufficient carbon chain length.

The non-radical polymerizable siloxane C having hydrophobic hydrocarbon functional groups is connected to the surface of the silica particle by hydrolysis of the silicon-oxygen bond at the initial stage of the reaction, and is also connected by the silicon-oxygen bond to a hydrophilic primary polymer generated through the reaction between A and B such that the primary polymer particle is amphiphilic, thus promoting the production of "micelle". During the reaction, hydrophobic molecules enter the reaction "micelle" through "swelling", and by controlling the degree of reaction, some of hydrophobic molecules are not hydrolyzed and are finally encapsulated inside the particle. After the particle is added to the cement-based material, the silica reacts with alkali and is thus dissolved, and the unhydrolyzed part is released and adhered to the surface of the hydration product in the pores to make the surface hydrophobic.

The siloxane or organofunctional group substituted siloxane D is one of or any combination of more than one of siloxanes having a structure of the following formula (4),

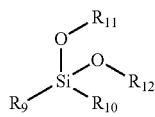
(4)

where $R_9$ and $R_{10}$ each independently represent saturated alkyl with 1 to 6 carbon atoms or saturated alkoxy with 1 to 4 carbon atoms, and $R_{11}$ and $R_{12}$ each independently represent saturated alkyl with 1 to 4 carbon atoms.

The siloxane or organofunctional group substituted siloxane D contains at least two alkoxy groups, and the functional groups other than the alkoxy groups are hydrocarbon functional groups with 1 to 6 carbon atoms, and the hydrocarbon functional groups are mainly for having a hydrolysis reaction to obtain a matrix of silica in the hybrid nanoparticle; its shell has an attached hydrophilic long-side-chain polymer obtained through the reaction between A and B, and additionally has attached hydrophobic hydrocarbon functional groups from C; its interior also has attached hydrophobic hydrocarbon functional groups from C and D and the hydrophobic functional groups can take an effect like "micelle", so that hydrophobic molecules can enter the interior of the nanoparticle by a swelling-like effect. On the other hand, by controlling the degree of reaction, the siloxane or organofunctional group substituted siloxane D is also hydrolyzed in the "micelle" to produce a silicon-oxygen bond network, which becomes a "skeleton" in the "micelle", preventing the problem that the amphiphilic particle loses its effect because the particle ruptures during the subsequent mixing and application and the hydrophobic molecules encapsulated in the particle overflow.

The organic component E is one of or any combination of more than one of saturated or a unsaturated long-chain fatty acid or fatty acid ester F and an aluminum complex G of a saturated or unsaturated aliphatic long-chain fatty acid.

The saturated or unsaturated long-chain fatty acid or fatty acid ester F is one of or any combination of more than one of saturated or unsaturated long-chain fatty acids or fatty acid esters having a structure of the following formula (5),

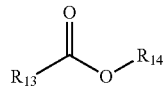
(5)

where the functional group $R_{13}$ represents a hydrocarbon functional group with 5 to 21 carbon atoms, and $R_{14}$ represents H or saturated alkyl with 1 to 22 carbon atoms.

The aluminum complex G of the saturated or unsaturated aliphatic long-chain fatty acid is one of or any combination of more than one of aluminum complexes of formula $Al(R_{15}COO)_3$ or $Al(OH)(R_{16}COO)_2$, where $R_{15}$ and $R_{16}$ each independently represent a saturated or unsaturated hydrocarbon functional group with 8 to 18 carbon atoms.

The above functional groups $R_{13}$, $R_{15}$ and $R_{16}$ are also sources of hydrophobicity (in order to control the water permeability of cement-based materials, a sufficient carbon chain length should be ensured); and $R_{14}$ is introduced for regulating the release rate of the hydrophobic component in the saturated or unsaturated long-chain fatty acid or fatty acid ester F, and the longer the length of $R_{14}$, the slower the release of the long-chain fatty.

An organic component E is released in a strong alkaline environment of a cement-based material and gradually produces a saturated or unsaturated long-chain fatty acid directly or by hydrolysis, and the saturated or unsaturated long-chain fatty acid is attached, in pores, to the surface of the cement-based material by complex precipitation of $Ca^{2+}$, etc., so that the pore interface of the cement-based material becomes hydrophobic, thereby weakening water permeability. Moreover, the component Al is also beneficial to formation of a nano-layered $Al_2O_3$ structure, and the structure also has a significant effect of filling the pores of the cement-based material and compacting the matrix, which can effectively reduce the permeability of harmful components such as chloride ions.

The total mass of effective reactants (A+B+C+D+E) in the reaction system accounts for no more than 30% of the total mass of the reaction system; the polymerizable monomer A accounts for 5-20% of the total mass of the effective reactants; the total mass of B and D accounts for 20-75% of the total mass of the effective reactants (A+B+C+D+E), and the mass of B accounts for 5-10% of the total mass of B and D; the total mass of C and E accounts for 20-75% of the total mass of the effective reactants (A+B+C+D+E), and the mass of C accounts for 20-80% of the total mass of C and E (C+E); the ratio of F to G in the organic component E is arbitrary; the use of water added in the step (1) accounts for 50-90% of the total water consumption of the reaction.

As mentioned above, A is a source of hydrophilicity and steric stabilization of the surface of the particle, if its content is too low, the particle will agglomerate, and if its content is too high, the initial polymer "micelle" will be hardly formed due to excessive hydrophilicity, which affects particle preparation; B is the key to connect A to the particle surface, so its content should be moderate; D is the main source of the silicon-oxygen bond network in the nanoparticle, so its content can not be too low; C is an necessary hydrophobic functional group participating in the formation of the "micelle" or "latex particle" in the initial polymerization reaction, so its content should not be too low.

In order to meet the requirement for stability in the preparation of the polymer particle, the dosages of the components (A, C, and D) added in batches in the preparation steps also need to be defined as follows:

If the polymerizable monomer A of formula (1) is adopted, all the polymerizable monomer A needs to be added at once in the preparation reaction step (1); if the polymerizable monomer A of formula (2) is used, the first batch of the polymerizable monomer A added in step (1) accounts for 0-10% of the total polymerizable monomer A by mass, and the remaining second batch of the polymerizable monomer A needs to be dropwise added uniformly in step (2).

The non-radical polymerizable siloxane C having hydrophobic hydrocarbon functional groups is added to the reaction system in three batches, the first batch of the siloxane C added in the preparation reaction step (1) accounts for 5-25% of the total mass of the siloxane C, so as to advance the formation time of the "micelle" and "latex particle" in the polymerization reaction and promote the preparation of the particle, and the proportions of the remaining second batch added in the preparation reaction step (2) and the remaining third batch added in the preparation reaction step (3) are arbitrary.

The siloxane or organofunctional group substituted siloxane D is added to the reaction system in two batches; the first batch of the siloxane or organofunctional group substituted siloxane D added in the preparation reaction step (1) accounts for 0-30% of the total mass of D, and the remaining second batch of D is dropwise added uniformly in the preparation reaction step (2). If the dosage of the siloxane D in step (1) is too high, it is easy to form larger silica particles to cause coagulation before the formation of the latex particle.

Controlling the pH of the reaction system not higher than 10 is to inhibit the saturated or unsaturated aliphatic long-chain fatty acid F and the aluminum complex G from ionization or hydrolysis. If F and G react and generate a fatty acid salt (sodium, potassium or calcium salts, etc.) during the preparation reaction, the fatty acid salt is prone to spontaneous formation of micelles, destroying the sites where polymerization and hydrolysis reactions occur; and the micelles are unstable, which is likely to cause unstable gelation of the reaction system. On the other hand, a too low pH will cause the siloxane to hydrolyze too quickly, while the electrostatic repulsion of the nanoparticle is destroyed and fails.

In order to control the hydrolysis process of all siloxanes, the reaction temperature should not be too high. The high degree of hydrolysis will make the content of silicon-oxygen bond network in the nanoparticles higher; thus, on one hand, the release time of the hydrophobic component is delayed, and on the other hand, most of the hydrophobic long-chain siloxanes will be covalently bonded to the nanoparticle and thus hardly released even after addition to a cement-based material, which is disadvantageous for reducing the water permeability of the cement-based material.

The reaction time set in the preparation method is to adjust the degree of hydrolysis of C and D. When the degree of hydrolysis is high, the content of the part forming the silicon-oxygen bond network is higher, and the components which can be freely released in the later stage will be reduced accordingly, but the structural stability of the particle itself is increased accordingly. Generally, when the reaction temperature is high, the reaction time can be shortened accordingly, and when the reaction temperature is low, the reaction time can be increased accordingly. Those skilled in the art may adjust the reaction temperature according to the requirements for application performance of the particle.

The initiator used in the preparation method disclosed in the present invention is a conventional initiator system used by those skilled in the art. The initiator is a thermal initiator or a redox initiator and only needs to satisfy the following conditions: the initiator can successfully initiate polymerization at the corresponding reaction pH and temperature, and the initiator is sufficiently decomposed during the reaction to prevent the change after the end of the reaction from affecting the storage stability of the aqueous dispersion of the nanoparticle.

The dosage of the initiator is calculated as follows: if it is a thermal initiator, the mass of the initiator is 0.4-4% of the total mass of the polymerizable monomer A and the polymerizable siloxane B; if it is a redox initiator, the mass of an oxidizing agent and the mass of a reducing agent are each 0.1-4% of the total mass of the polymerizable monomer A and the polymerizable siloxane B.

The thermal initiator includes azobisisobutyrazoline hydrochloride (VA044), azobisisobutylphosphonium hydrochloride (V50), benzoyl peroxide, azobisisobutyronitrile (AIBN); the redox initiator is composed of an oxidizing agent and a reducing agent, wherein the oxidizing agent includes hydrogen peroxide, ammonium persulfate and potassium persulfate, and the reducing agent includes ascorbic acid, sodium hydrogen sulfite and rongalite.

The application of the amphiphilic multifunctional hybrid nanoparticle of the present invention is as follows: in the case of preparation of a cement-based material, the organic-inorganic hybrid particle is directly added at a time and mixed in the mixing process; a suitable dosage of the hybrid nanoparticle is 0.1-0.5% of the total mass of the cementing material. Under this dosage, the permeability resistance is significantly improved. In addition, the addition of more particles will improve the permeability resistance, but the cost is increased more obviously and the economical efficiency is relatively low. The term "dosage" as used in the present invention refers to a ratio of the mass of the particle in the finally synthesized aqueous dispersion of the present invention to the mass of the cementing material in the cement-based material.

When the amphiphilic hybrid particle of the present invention is used for the modification of a cement-based material, the higher dosage results in an obvious improvement in permeability resistance and mechanical properties of the cement-based material. The dosage (bwoc %) is calculated at a proportion relative to the total mass of the cementing material. When the dosage is 0.4 bwoc %, the 7-day water absorption of concrete is reduced by 45-80%, the 28-day Cl-diffusion coefficient of the concrete is reduced by 60-82%, the 28-day electric flux of the concrete is decreased by 45-70%, and the 28-day compressive strength of the concrete is increased by 5-17%.

Compared with the conventional technology or material, the amphiphilic hybrid nanoparticle provided by the present invention can solve the following problems in a targeted manner, thereby fully improving the permeability resistance and mechanical properties of the cement-based material itself:

(1) Reducing water permeability: when the amphiphilic nanoparticle having good storage stability is added to a cement-based material, hydrophilic long chains allow particles to be uniformly and stably dispersed in the matrix of the cement-based material; after its surface hydrophilic groups are detached due to alkaline hydrolysis, the particle surface becomes hydrophobic, and the hydrophobic functional groups will cover the surface of the cement-based material with the hydration reaction; on the other hand, with the hydration dissolution and rupture of silica, the hydrophobic components contained in the silicon-oxygen bond network of the nanoparticle will be gradually released from the particles; hydrophobic silanes, fatty acids, fatty acid esters, aluminum complexes of fatty acid are gradually converted into hydrophobic components in an alkaline environment or directly grown or complexed and adsorbed at the pore interface with strong adhesion; moreover, in the case of use of hydrophobic (a fatty acid, a hydrophobic silane) organic water repellent alone, the water repellent may lose efficacy or have properties reduced for different reasons that the water repellent is embedded by hydration products because it is hardly dispersed (agglomerated) uniformly and fast anchored to the surface of cement particles at the beginning of the reaction and that the water repellent is difficultly dissolved and thus floats; however, the use of the amphiphilic nanoparticle can avoid these problems. All these factors cause the hydrophobic components to fully act on the internal pores of the cement-based material, greatly reducing the water permeability of the cement-based material.

(2) Reducing the permeability of other substances such as chloride ions: the silicon-oxygen bond network and the aluminum-oxygen bond network will react with the cement-based material, consuming lamellar calcium hydroxide to form finer hydration products such as CSH and promoting the formation of high-density CSH; moreover, the filling effect of the stably dispersed nanoparticles also reduces the interconnected voids in the material, and the pore structure is sufficiently refined to reduce the permeability of harmful substances; compared with a cement-based material using the conventional nano silica, the cement-based material using the hybrid nanoparticle prepared according to the present invention has the internal hydration products and interfaces are hydrophobized, further reducing the possibility that the harmful particles erode the cement-based material through moisture penetration, and thus its permeability resistance is improved more obviously.

(3) No adverse effect or slight improvement on mechanical properties: the particle prepared according to the present invention has excellent improvement in the permeability resistance of the cement-based material, which can effectively reduce the dosage of the particle itself and weaken adverse effects of hydrophobic components on the hydration; due to the gradual release of hydrophobic components, both fatty acid compounds (complexed with the covalent bonds of Al or complexed with Ca) and hydrophobic silicone molecules (covalent bonds) can have strong interaction with hydration products of the cement at a more uniform level, thus forming an overall chemical structure with the entire cement concrete, avoiding the risk that fatty acid compounds and the like easily migrate in the mortar and concrete and thus damage the interlayer structure or the risk that saponified gel agglomerates are formed and become internal defects of the cement-based material and thus reduce its strength; furthermore, Si—Al oxides participate in the hydration reaction and compact the matrix of the cement-based material, which is beneficial to the improvement of its mechanical properties.

BRIEF DESCRIPTION OF THE SEVERAL VIEWS OF THE DRAWINGS

FIG. 1 is a radial distribution of the hybrid particle prepared in Example 3 as measured by dynamic light scattering.

DETAILED DESCRIPTION OF THE INVENTION

In order to better understand the present invention, the contents of the present invention will be further clarified below with reference to embodiments, but the contents of the present invention are not limited to the following embodiments.

The units used below are all parts by mass, and all the compounds used are commercially available or synthetic products that have been reported.

The polymerizable monomer A of formula (2) is a commercially available reagent or a commercial product (Sigma-Aldrich, Meryer (Shanghai) Chemical Technology Co., Ltd., Huntsman, etc.) or synthesized according to the reference, and is prepared from methacrylic acid, acrylic acid and polyether by esterification or amidation (e.g., Polymer-Plastics Technology and Engineering, 2011, 50, 59), using a condensing agent for dehydration condensation reaction, for example, using a condensing agent N,N-dicyclohexylcarbodiimide (DCC) for condensation in the presence of a catalyst 4-dimethylaminopyridine (DMAP), or using a dehydrating agent such as toluene or cyclohexane for azeotropic dehydration in the presence of a strong acid functioning as a catalyst.

A2 is a reagent, and A4 and A5 are commonly used raw materials for domestic water reducing agent production, and are both commercially available.

Siloxanes B, C and D are all from commercially available reagents or industrial products (Meryer (Shanghai) Chemical Technology Co., Bailingwei Reagent and Sigma-Aldrich). The source of the aluminum complex G is synthesized according to the reference (J. Am. Chem. Soc., 1948, 70, 1053-1054) or a commercial reagent.

In addition, in general, under the condition of a high solid content, the preparation reaction of the hybrid particle is difficult, for example, aggregation occurs easily due to an excessive reaction rate, which results in loss of stability (particle agglomeration occurs); therefore, it can be controlled more easily than samples with a low solid content. The following embodiments which disclose the preparation of samples with a relatively high solid content (the total mass of A, B, C, D and E is 10-30% of the total mass of the reaction system) are described and compared.

TABLE 1

Names of compounds used in the embodiments

| | |
|---|---|
| A1 | Polyethylene glycol monomethyl ether methacrylate, b = 8 |
| A2 | Polyethylene glycol monomethyl ether acrylate, b = 22 |
| A3 | N-poly(ethylene oxide-propylene oxide) monomethyl ether acrylamide, a + b = 42, a/(a + b) = 0.3 |
| A4 | Methyl allyl polyglycol ether, b = 114 |
| A5 | Allyl polyglycol ether, b = 8 |
| A6 | Polyethylene glycol monomethyl ether methacrylate, b = 114 |
| B1 | Methacryloxypropyltrimethoxysilane |
| B2 | Methacryloxypropyltriethoxysilane |
| B3 | Acryloyloxypropyltriethoxysilane |
| B4 | Acryloyloxymethyltrimethoxysilane |
| B5 | Acryloyloxypropyltrimethoxysilane |
| C1 | N-octyltrimethoxysilane |

TABLE 1-continued

Names of compounds used in the embodiments

| | |
|---|---|
| C2 | N-octadecyltrimethoxysilane |
| C3 | N-dodecyltriethoxysilane |
| C4 | N-docosyltrimethoxysilane |
| C5 | Isobutyl trimethoxysilane |
| C6 | 5-hexenyltrimethoxysilane |
| D1 | Tetraethoxysilane |
| D2 | Tetramethoxysilane |
| D3 | Di-n-butyldimethoxysilane |
| D4 | Methyltriethoxysilane |
| D5 | Dimethyldiethoxysilane |
| D6 | Phenyltriethoxysilane |
| F1 | N-hexylic acid |
| F2 | Tetradecyl didodecanoate |
| F3 | Oleic acid |
| F4 | Methyl laurate |
| F5 | Benzoic acid |
| G1 | Aluminum hydroxylaurate |
| G2 | Aluminum stearate |
| G3 | Aluminum 2-ethylhexanoate |

The structural formulas of the names of the compounds in Table 1 are as follows:

Monomer A

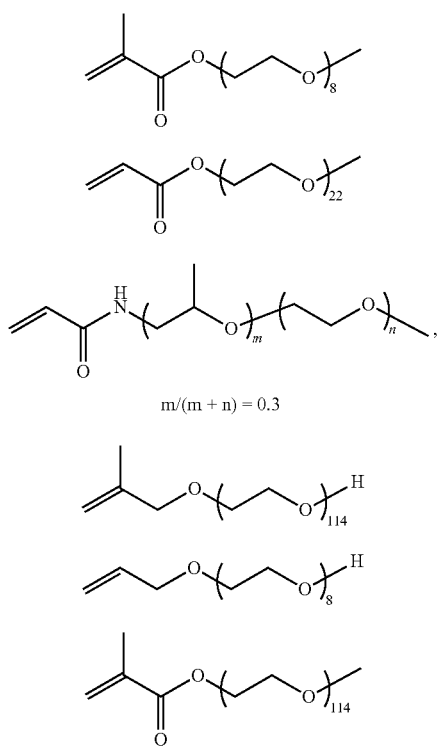

Siloxane B

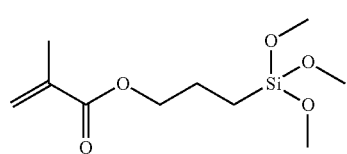

Siloxane C

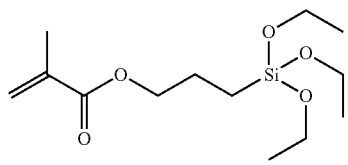
B2

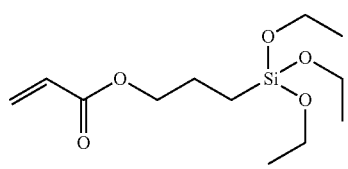
B3

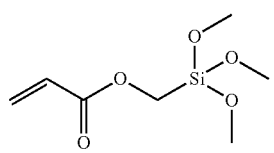
B4

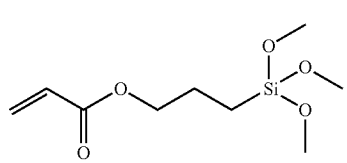
B5

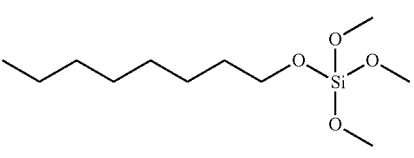
C1

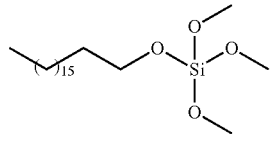
C2

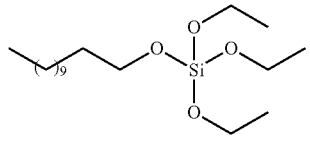
C3

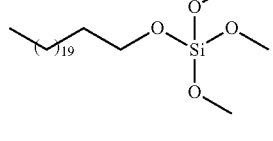
C4

C5

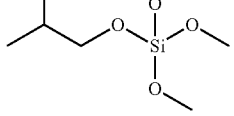
C6

-continued

Siloxane D

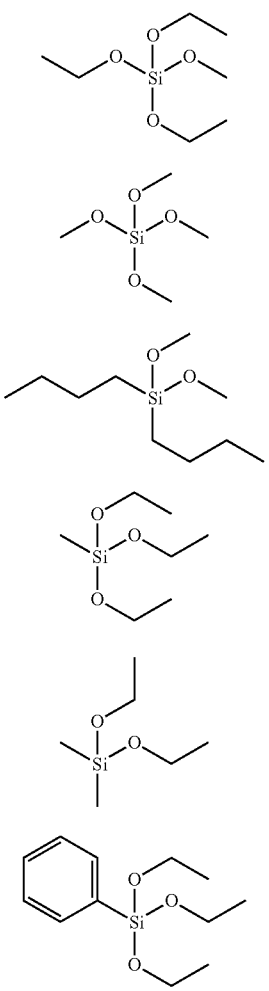

Hydrophobic Component E

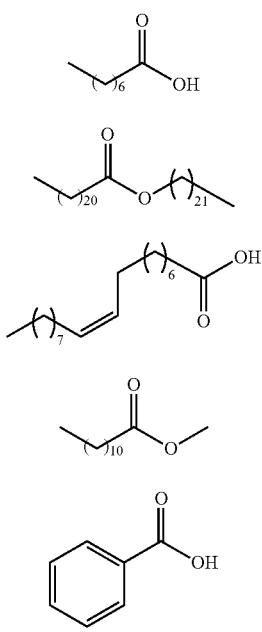

-continued

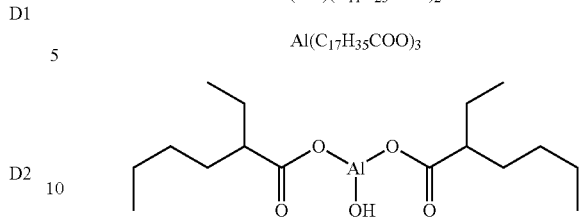

| | |
|---|---|
| D1 | |
| D2 | |
| D3 | |
| D4 | |
| D5 | |
| D6 | |
| F1 | |
| F2 | |
| F3 | |
| F4 | |
| F5 | |
| G1 | Al(OH)(C₁₁H₂₃COO)₂ |
| G2 | Al(C₁₇H₃₅COO)₃ |
| G3 | |

(1) Preparation of Part of Polymerizable Monomers A (1) A1 (Polyethylene Glycol Monomethyl Ether Methacrylate, b=8), Prepared from Methacrylic Acid and Polyethylene Glycol Monomethyl Ether (with a Number-Average Molecular Weight of 350, MPEG350, from Sigma-Aldrich):

Methacrylic acid (9.03 g, 0.105 mol) and polyethylene glycol monomethyl ether (with a number-average molecular weight of 350) (35 g, 0.1 mol) were dissolved in 500 mL of CHCl3, and DMAP (122 mg, 1 mmol) was then added thereto; a solution of DCC (22.67 g, 0.11 mol) dissolved in CHCl$_3$ (200 mL) was dropwise added at room temperature, and 2 hours later, a white precipitate appeared in the system; the solution was further stirred for 2 hours, then filtered, and distilled under reduced pressure; the obtained liquid was dissolved with CHCl$_3$, then precipitated with diethyl ether, and then centrifuged to take the lower liquid; the obtained liquid was repeatedly subjected to CHCl$_3$/diethyl ether precipitation twice, and the final product was vacuum-dried to obtain a monomer A1 with a yield of 91%.

(2) A3 (N-Poly(Ethylene Oxide-Propylene Oxide) Monomethyl Ether Acrylamide, a+b=42, a/(a+b)=0.3), Prepared by the Reaction of Acrylic Acid and Amino Poly (Ethylene Oxide-Propylene Oxide) Monomethyl Ether (with a Number-Average Molecular Weight of 2000, m/n=7/3, m+n=42, from Huntsman):

Acrylic acid (7.56 g, 0.105 mol) and amino poly(ethylene oxide-propylene oxide) monomethyl ether (with a number-average molecular weight of 2000) (200 g, 0.1 mol) was dissolved in 1000 mL of CHCl3, and DMAP (0.122 g, 1 mmol) was then added thereto; a solution of DCC (22.67 g, 0.11 mol) dissolved in CHCl$_3$ (200 mL) was dropwise added at room temperature, and 4 hours later, a white precipitate appeared in the system; the solution was further stirred for 6 hours, then filtered, and distilled under reduced pressure; the obtained solid was dissolved with CHCl$_3$, then precipitated with diethyl ether, and then filtered; the obtained solid was then repeatedly subjected to CHCl$_3$/diethyl ether precipitation twice, and the final product was vacuum-dried to obtain a monomer A3 with a yield of 80%.

(3) A6 (Polyethylene Glycol Monomethyl Ether Methacrylate, b=114), Prepared by the Reaction of Methacrylic Acid and Polyethylene Glycol Monomethyl Ether (with a Number-Average Molecular Weight of 5000, from Sigma-Aldrich):

Methacrylic acid (9.03 g, 0.105 mol) and polyethylene glycol monomethyl ether (with a number-average molecular weight of 5000) (500 g, 0.1 mol) were dissolved in 2000 mL of CHCl3, and DMAP (122 mg, 1 mmol) was then added thereto; a solution of DCC (22.67 g, 0.11 mol) dissolved in CHCl3 (200 mL) was dropwise added at room temperature, and 12 hours later, a white precipitate appeared in the system; the solution was further stirred for 12 hours, then filtered, and distilled under reduced pressure; the obtained liquid was dissolved with $CHCl_3$, and then precipitated with diethyl ether; the obtained solid was repeatedly subjected to $CHCl_3$/diethyl ether precipitation twice, and the final product was vacuum-dried to obtain a monomer A6 with a yield of 73%.

(2) Preparation of a Hybrid Nanoparticle Dispersion

Example 1

(1) 0.75 part of A1, 0.375 part of C1 and 200 parts of water were added to a reactor. Stirring was carried out to thoroughly mix the solution, the pH of the mixed solution was adjusted to 2 with dilute sulfuric acid, $N_2$ was introduced in the mixed solution to remove $O_2$, and the temperature of the reaction system was adjusted to 5° C.

(2) 0.56 part of 30% $H_2O_2$ was added to the solution immediately, and after stirring for 5 minutes, an aqueous solution of ascorbic acid (prepared by dissolving 0.437 part of the ascorbic acid in 49 parts of water) was dropwise added thereto, and a mixed solution comprising 11.25 parts of the polymerizable siloxane B1, 101.25 parts of the organosiloxane D1 and 7.125 parts of C1 and an aqueous solution of the polymerizable monomer A1 (prepared by dissolving 6.75 parts of the polymerizable monomer A1 in 100 parts of water) was also dropwise added uniformly to react for 2 hours.

(3) 22.5 parts of F1 was added, the reaction system was stirred for 1 hour, the reaction system was then returned to room temperature, and the pH of the dispersion was adjusted to 7 with a sodium hydroxide solution to obtain a dispersion P1 of the hybrid nanoparticle.

Example 2

(1) 0.5 part of A2, 2.25 parts of C1 and 300 parts of water were added to a reactor. Stirring was carried out to thoroughly mix the solution, $N_2$ was introduced in the mixed solution to remove $O_2$, the pH of the mixed solution was adjusted to 4 with dilute sulfuric acid, and the temperature of the reaction system was adjusted to 5° C.

(2) 0.22 part of 30% $H_2O_2$ was added to the solution immediately, and after stirring for 5 minutes, an aqueous solution of rongalite (prepared by dissolving 0.1 part of the rongalite in 49.695 parts of water) was added dropwise thereto, and a mixed solution comprising 0.5 parts of the polymerizable siloxane B2, 9.5 parts of the organosiloxane D6 and 6 parts of C1 and an aqueous solution of the polymerizable monomer A2 (prepared by dissolving 4.5 parts of the polymerizable monomer A2 in 100 parts of water) were also dropwise added uniformly to react for 4 hours.

(3) 6.75 parts of C1, 10 parts of F1 and 10 parts of G1 were added, the reaction system was stirred for 1 hour and then returned to room temperature, and the pH of the dispersion was adjusted to 7 with a sodium hydroxide solution to obtain a dispersion P2 of the hybrid nanoparticle.

Example 3

(1) 30 parts of A3, 3.75 parts of C2 and 250 parts of water were added to a reactor. Stirring was carried out to thoroughly mix the solution, the pH of the mixed solution was adjusted to 10 with a sodium hydroxide solution, $N_2$ was introduced in the mixed solution to remove $O_2$, and the temperature of the reaction system was increased to 60° C.

(2) An aqueous solution of ammonium persulfate (prepared by dissolving 0.72 part of the ammonium persulfate in 49.28 parts of water) and an aqueous solution of sodium hydrogen sulfite (prepared by dissolving 0.72 part of the sodium hydrogen sulfite in 49.28 parts of water) were dropwise added simultaneously and immediately, and a mixed solution comprising 6 parts of the polymerizable siloxane B3, 69 parts of the organosiloxane D2 and 6 parts of C2 was also dropwise added uniformly to react for 3 hours.

(3) 5.25 parts of C2, 6 parts of F3 and 24 parts of G2 were added, the reaction system was stirred for 1 hour and then returned to room temperature, and the pH of the dispersion was adjusted to 7 to obtain a dispersion P3 of the hybrid nanoparticle.

Reference can be made to FIG. 1 for the particle size test results of this batch of samples, the corresponding average radius is (159±116) nm, and PDI is 0.527; the test instrument used is ALV/CGS-3, the incident angle is 90°, the laser wavelength is 620 nm, and the corresponding average radius is (159±116) nm and PDI is 0.527.

Example 4

(1) 0.5 part of A4, 1.6 parts of C3 and 250 parts of water were added to a reactor, stirring was carried out to thoroughly mix the solution, the pH of the mixed solution was adjusted to 9 with a sodium hydroxide solution, $N_2$ was introduced in the mixed solution to remove $O_2$, and the temperature of the reaction system was increased to 40° C.

(2) an aqueous solution of VA044 (prepared by dissolving 0.25 part of VA044 in 49.75 parts of water) was added to the mixed solution at a time immediately, and a mixed solution comprising 7.5 parts of B4, 67.5 parts of D5 and 8 parts of C3 and an aqueous solution of A4 (prepared by dissolving 4.5 parts of A4 in 100 parts of water) are also uniformly added dropwise to react for 6 hours.

(3) 6.4 parts of C3 and 4 parts of G1 were added, the reaction system was stirred for 3 hours and then returned to room temperature, and the pH of the dispersion was adjusted to 7 to obtain a dispersion P4 of the hybrid nanoparticle.

Example 5

(1) 15 part of A4, 1.12 parts of C3, 15.98 parts of D3 and 300 parts of water were added to a reactor, stirring was carried out to thoroughly mix the solution, the pH of the mixed solution was adjusted to 9 with a sodium hydroxide solution, $N_2$ was introduced in the mixed solution to remove $O_2$, and the temperature of the reaction system was increased to 60° C.

(2) An aqueous solution of V50 (prepared by dissolving 0.21 part of V50 in 49.79 parts of water) was added to the mixed solution at a time immediately, and a mixed solution comprising 6 parts of B4, 90.52 parts of D5 and 10.13 parts of C3 was also dropwise added uniformly to react for 4 hours.

(3) 7.5 parts of F4 and 3.75 parts of G3 were added at a time, the reaction system was stirred for 2 hours and then returned to room temperature, and the pH of the dispersion was adjusted to 7 to obtain a dispersion P5 of the hybrid nanoparticle.

Example 6

(1) 1.5 parts of A6, 1.5 parts of C5, 15.19 parts of D4 and 200 parts of water were added to a reactor, stirring was carried out to thoroughly mix the solution, the pH of the mixed solution was adjusted to 4 with sulfuric acid, $N_2$ was introduced in the mixed solution to remove $O_2$, and the temperature of the reaction system was adjusted to 10° C.

(2) 0.2 part of 30% $H_2O_2$ was added to the solution immediately, and after stirring for 5 minutes, an aqueous solution of ascorbic acid (prepared by dissolving 0.156 part of the ascorbic acid in 49.644 parts of water) was dropwise added thereto, and a mixed solution comprising 11.25 parts of B1, 86.06 parts of D4 and 4.5 parts of C5 and an aqueous solution of A6 (prepared by dissolving 28.5 parts of A6 in 100 parts of water) were also dropwise added uniformly to react for 2 hours.

(3) 1.5 parts of F2 was added at a time, the reaction system was stirred for 0.5 hour and then returned to room temperature, and the pH of the dispersion was adjusted to 7 to obtain a dispersion P6 of the hybrid nanoparticle.

Example 7

(1) 0.75 part of A1, 11.25 parts of C4, 4.28 parts of D4 and 200 parts of water were added to a reactor, stirring was carried out to thoroughly mix the solution, the pH of the mixed solution was adjusted to 9 with a sodium hydroxide solution, $N_2$ was introduced in the mixed solution to remove $O_2$, and the temperature of the reaction system was adjusted to 70° C.

(2) An aqueous solution of ammonium persulfate (prepared by dissolving 0.18 part of the ammonium persulfate in 49.82 parts of water) was added to the mixed solution at a time, and a mixed solution comprising 1.5 parts of B3 and 24.22 parts of D4 and an aqueous solution of A1 (prepared by dissolving 6.75 parts of A1 in 100 parts of water) were also dropwise added uniformly to react for 6 hours.

(3) 33.75 parts of C4, 30 parts of F4 and 37.5 parts of G1 were added at a time, the reaction system was stirred for 2 hours and then returned to room temperature, and the pH of the dispersion was adjusted to 7 to obtain a dispersion P7 of the hybrid nanoparticle.

Example 8

(1) 1.5 part of A2, 0.9 part of C3, 15.19 parts of D3 and 200 parts of water were added to a reactor, stirring was carried out to thoroughly mix the solution, the pH of the mixed solution was adjusted to 9 with a sodium hydroxide solution, $N_2$ was introduced in the mixed solution to remove $O_2$, and the temperature of the reaction system was adjusted to 45° C.

(2) An aqueous solution of VA044 (prepared by dissolving 0.525 part of VA044 in 49.475 parts of water) was added to the mixed solution at a time immediately, and a mixed solution comprising 11.25 parts of B4, 86.06 parts of D3 and 5.4 parts of C3 and an aqueous solution of A2 (prepared by dissolving 13.5 parts of A2 in 100 parts of water) were also dropwise added uniformly to react for 6 hours.

(3) 11.7 parts of C3 and 4.5 parts of F2 were added at a time, the reaction system was stirred for 1 hour and then returned to room temperature, and the pH of the dispersion was adjusted to 7 to obtain a dispersion P8 of the hybrid nanoparticle.

Example 9

(1) 30 parts of A3, 1.8 parts of C5, 8.55 parts of D5 and 300 parts of water were added to a reactor, stirring was carried out to thoroughly mix the solution, the pH of the mixed solution was adjusted to 2 with sulfuric acid, $N_2$ was introduced in the mixed solution to remove $O_2$, and the temperature of the reaction system was adjusted to 25° C.

(2) 0.31 part of 30% $H_2O_2$ was immediately added to the solution, and after stirring for 5 minutes, an aqueous solution of ascorbic acid (prepared by dissolving 0.24 part of the ascorbic acid in 49.45 parts of water) was dropwise added thereto, and a mixed solution comprising 1.5 parts of B2, 19.95 parts of D5 and 16.2 parts of C5 was also dropwise added uniformly to react for 1 hour.

(3) 60 parts of F2 and 12 parts of G2 were added at a time, the reaction system was stirred for 3 hours and then returned to room temperature, and the pH of the dispersion was adjusted to 7 to obtain a dispersion P9 of the hybrid nanoparticle.

Example 10

(1) 2.25 parts of C1, 3.6 parts of D1, and 325 parts of water were added to a reactor, stirring was carried out to thoroughly mix the solution, the pH of the mixed solution was adjusted to 4 with sulfuric acid, N2 was introduced in the mixed solution to remove O2, and the temperature of the reaction system was adjusted to 70° C.

(2) 0.136 part of AIBN was dropwise added immediately, and a mixed solution comprising 3 parts of B2, 8.4 parts of D1 and 4.5 parts of C1 and an aqueous solution of A4 (prepared by dissolving 3.75 parts of A4 in 99.864 parts of water) were also dropwise added uniformly to react for 4 hours.

(3) 38.25 parts of C1 and 11.25 parts of G3 were added at a time, the reaction system was stirred for 3 hours and then returned to room temperature, and the pH of the dispersion was adjusted to 7 to obtain a dispersion P10 of the hybrid nanoparticle.

Example 11

(1) 15 parts of A5, 9.38 parts of C6, 17.1 parts of D6 and 250 parts of water were added to a reactor, stirring was carried out to thoroughly mix the solution, the pH of the mixed solution was adjusted to 2 with sulfuric acid, $N_2$ was introduced in the mixed solution to remove $O_2$, and the temperature of the reaction system was adjusted to 55° C.

(2) An aqueous solution of ammonium persulfate (prepared by dissolving 0.18 part of the ammonium persulfate in 49.82 parts of water) and an aqueous solution of sodium hydrogen sulfite (prepared by dissolving 0.36 part of the sodium hydrogen sulfite in 49.64 parts of water) were dropwise added uniformly and separately, and a mixed solution comprising 3 parts of B5, 39.9 parts of D6 and 18.75 parts of C6 was also dropwise added uniformly to react for 3 hours.

(3) 9.37 parts of C6, 7.5 parts of F5 and 30 parts of G2 were added at a time, the reaction system was stirred for 2 hours and then returned to room temperature, and the pH of the dispersion was adjusted to 7 to obtain a dispersion P11 of the hybrid nanoparticle.

Example 12

(1) 2 parts of A6, 0.5 parts of C2, 16.8 parts of D2 and 200 parts of water were added to a reactor, stirring was carried out to thoroughly mix the solution, the pH of the mixed solution was adjusted to 2 with sulfuric acid, $N_2$ was introduced in the mixed solution to remove $O_2$, and the temperature of the reaction system was adjusted to 10° C.

(2) 0.24 part of 30% $H_2O_2$ was added to the solution immediately, and after stirring for 5 minutes, an aqueous solution of ascorbic acid (prepared by dissolving 0.123 part of the ascorbic acid in 49.637 parts of water) was dropwise added thereto, and a mixed solution comprising 4 parts of B1, 39.2 parts of D2 and 8 parts of C2 and an aqueous solution of A6 (prepared by dissolving 18 parts of A6 in 100 parts of water) were also dropwise added uniformly to react for 3 hours.

(3) 1.5 parts of C2, 5 parts of F5 and 5 parts of G3 were added at a time, the reaction system was stirred for 2 hour and then returned to room temperature, and the pH of the dispersion was adjusted to 7 to obtain a dispersion P12 of the hybrid nanoparticle.

3. Effect Comparison

Concrete application tests will be mainly described below to illustrate the use effect of the amphiphilic hybrid nanoparticle of the present patent. The mechanical property tests of concrete were carried out with reference to GB/T50080-2002 and GB/T50081-2002, the chloride ion permeability and electric flux tests were carried out with reference to GB/T50082-2009, and the water absorption of concrete was carried out with reference to BS1881-122-83. The slump of the concrete was adjusted to (20±1) cm by using a PCA-I® high-performance polycarboxylate water reducing agent produced by Jiangsu Subote New Material Co., Ltd., and its air content was adjusted to (2.5±0.3)%.

The materials used include: Jiangnan Xiaoyetian Cement (P•II•52.5), Grade II fly ash, river sand with a fineness modulus of 2.6, and 5-25 mm continuous graded gravel.

The mix proportion of the concrete is shown in Table 2. The test results of the concrete are shown in Table 3. Except for the age marked, all the test results are the test results of 28-day test blocks, and the water absorption is the weight increase of the test blocks soaked for 0.5 hour. The reference sample is concrete without the addition of the hybrid particle dispersions, and P1-P12 are concrete samples with an effective dosage of the hybrid particle being 0.4% relative to the total mass of cementing material. Zinc stearate is concrete with a dosage of calcium stearate being 1% relative to the total mass of cementing material; control sample 1 is concrete with zinc stearate and silica sol added separately, and the effective dosage of zinc stearate and silica sol is equivalent to 0.4% of the total mass of the cementing material; control sample 2 is a core-shell structured nanoparticle prepared according to the embodiment of the patent CN103922638B, and its dosage is 0.4% of the total mass of the cementing material.

All of the amphiphilic hybrid nanoparticle dispersions in the embodiments of the present invention can maintain good stability without coagulation when mixed with a saturated $Ca(OH)_2$ solution.

TABLE 2

Mix proportion of concrete

| Cement | Fly ash | Fine ore | Sand | Stone | Water |
|--------|---------|----------|------|-------|-------|
| 193    | 83      | 147      | 750  | 1067  | 147   |

TABLE 3

Properties of fresh concrete and macro-properties at different ages

| | Compressive strength (MPa) | Electric flux (C) | Cl⁻ diffusion coefficient ($10^{-12}$ m²/s) | Water absorption (%) at different ages | |
|---|---|---|---|---|---|
| | | | | 7 days | 28 days |
| Reference | 58.6 | 925.3 | 7.0 | 2.01 | 1.65 |
| P1 | 64.8 | 478.5 | 2.0 | 0.96 | 0.80 |
| P2 | 62.0 | 305.0 | 2.4 | 0.57 | 0.43 |
| P3 | 64.5 | 462.1 | 2.3 | 0.85 | 0.69 |
| P4 | 68.0 | 370.6 | 1.2 | 0.81 | 0.69 |
| P5 | 65.2 | 241.6 | 1.5 | 0.56 | 0.43 |
| P6 | 66.1 | 498.3 | 2.1 | 1.04 | 0.86 |
| P7 | 61.6 | 295.7 | 2.2 | 0.48 | 0.43 |
| P8 | 65.5 | 334.6 | 1.3 | 0.62 | 0.51 |
| P9 | 61.8 | 452.9 | 2.8 | 0.78 | 0.64 |
| P10 | 64.1 | 335.2 | 2.0 | 0.71 | 0.59 |
| P11 | 63.1 | 350.2 | 1.9 | 0.66 | 0.53 |
| P12 | 65.7 | 453.7 | 2.0 | 0.97 | 0.80 |
| Zinc stearate | 44.5 | 666.2 | 6.0 | 0.96 | 0.73 |
| Control sample 1 | 54.8 | 518.2 | 2.9 | 1.11 | 0.94 |
| Control sample 2 | 59.3 | 592.2 | 3.2 | 1.19 | 0.99 |

The following conclusion may be reached from the data in the table:

(1) Compared with the concrete reference sample, the 28-day compressive strength of the concrete samples doped with the amphiphilic hybrid nanoparticles of the present invention is increased slightly to varying degrees from 58.6 MPa to 61.6-68.0 MPa, with a strength increase of 5-16.2%; the 28-day electrical flux of the concrete samples is decreased from 925.3 C to 241.6-478.5 C, with a reduction of 46-74%; in addition, the 28-day Cl-diffusion coefficient of the concrete samples is decreased significantly from 7.0×$10^{-12}$ m²/s to 1.2-2.8×$10^{-12}$ m²/s, with a reduction of 59-83%; the 7-day water absorption and 28-day water absorption of the concrete samples are also reduced by 51-76% and 50-78% to varying degrees, respectively.

(2) In a case of a high dosage (1.0% of the total mass of the cementing material) of a stearate (here compared to zinc stearate), its effect of reducing water absorption is slightly weaker than that of the hybrid particle, but it also can significantly reduce water absorption by 52-56%, however, the compressive strength of the concrete is reduced by 24%, and it does not show significant effect in improving the Cl-diffusion coefficient; therefore, its performance is obviously inferior to that of the amphiphilic hybrid particle.

(3) The control sample 1 shows the application performance in a case where a stearate and silica sol are added into concrete separately. When the dosages of the stearate and silica sol are both 0.4% of the total mass of the cementing material, although the 28-day compressive strength of the concrete is weakened slightly, the electric flux, the Cl-diffusion coefficient, and the 7-day and 28-day water absorption of concrete can be reduced, but not as good as the amphiphilic hybrid nanoparticle.

More importantly, it is difficult to mix the stearate and silica sol and they must be added separately, which obviously increases the difficulty of application; in addition, silica sol will coagulate in a saturated $Ca(OH)_2$ solution and loses its stability. In contrast, all the amphiphilic hybrid particle dispersions maintain good stability when mixed with a saturated $Ca(OH)_2$ solution, without coagulation, and thus have superior application performance.

(4) The control sample 2 solves the problem of particle stability by using a core-shell structured particle, but its performance in improving the 28-day electric flux, the Cl-diffusion coefficient and the water absorption of concrete are obviously inferior to that of the amphiphilic hybrid particle.

What is claimed is:

1. An amphiphilic multifunctional hybrid nanoparticle having a detachable hydrophilic organic polymer with both a water-soluble chain and a hydrophobic hydrocarbon functional group attached to its surface, wherein a core of the nanoparticle is a silica or an organofunctional group substituted silicon dioxide or an organofunctional group substituted silicon-oxygen bond network, and the nanoparticle contains a free organosiloxane with hydrophobic hydrocarbon functional groups and a fatty acid or fatty acid ester or fatty acid aluminum complex with hydrophobic hydrocarbon functional groups;

the nanoparticle has an average diameter of not more than 1000 nm, wherein the nanoparticle is prepared through a polymerization-hydrolysis reaction using polymerizable monomer A, polymerizable siloxane B, siloxane C with hydrophobic hydrocarbon functional groups that does not undergo free radical polymerization, siloxane D, and organic component A, B, C, D, and E are effective reactants; one end of the polymerizable monomer A has a double bond that can participate in free radical polymerization reactions, and the other end has a water-soluble chain; the organic component E consists of one or more arbitrary mixtures of saturated or unsaturated fatty acids or fatty acid esters F, and aluminum complexes G of saturated or unsaturated fatty acids with fatty bases;

polymerizable monomer A is one of or any combination of more than one of structures represented by the following formula (1) and formula (2),

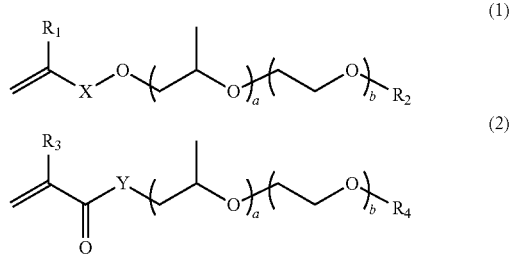

where $R_1$, $R_2$, $R_3$ and $R_4$ each independently represent H or $CH_3$, X represents $—OCH_2CH_2—$, $—OCH_2CH_2CH_2CH_2—$, or saturated alkyl with 1 to 4 carbon atoms, and Y represents $—NH—$ or $—O—$; a and b represent the average molar adduct numbers of ethoxy and isopropoxy in the side chain, respectively, the value of (a+b) ranges from 8 to 114 (8 and 114 are included), and the value of a/(a+b) is not more than ⅓;

the polymerizable siloxane B is any one of or a mixture of more than one of methacryloxypropyltrimethoxysilane (MAPTMS), methacryloxypropyltriethoxysilane (MAPTES), methacryloxymethyltriethoxysilane (AAPTES), acryloyloxymethyltrimethoxysilane (AAMTMS), and acryloxypropyltrimethoxysilane (AAPTMS);

the non-radical polymerizable siloxane C having hydrophobic hydrocarbon functional groups is one of or any combination of more than one of siloxanes having a structure of the following formula (3),

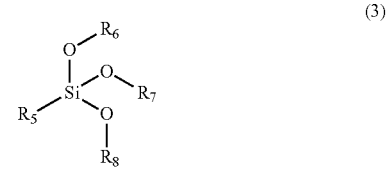

where $R_5$ represents a hydrocarbon functional group with 4 to 22 carbon atoms, $R_6$, $R_7$ and $R_8$ each independently represent saturated alkyl with 1 to 4 carbon atoms, and $R_5$, as a source of hydrophobicity of the particle;

the siloxane or organofunctional group substituted siloxane D is one of or any combination of more than one of siloxanes having a structure of the following general formula (4),

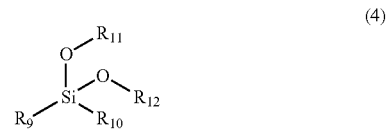

where $R_9$ and $R_{10}$ each independently represent saturated alkyl with 1 to 6 carbon atoms or saturated alkoxy with 1 to 4 carbon atoms, and Ru and Rig each independently represent saturated alkyl with 1 to 4 carbon atoms;

the saturated or unsaturated fatty acid or fatty acid ester F is one or more than any one of saturated or unsaturated fatty acid or fatty acid esters having a structure of the following formula (5),

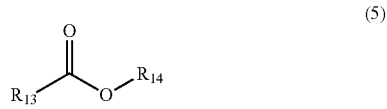

where the functional group $R_{13}$ represents a hydrocarbon functional group with 5 to 21 carbon atoms, and $R_{14}$ represents H or saturated alkyl with 1 to 22 carbon atoms;

the aluminum complex G of the saturated or unsaturated aliphatic fatty acid is one of or any combination of more than one of aluminum complexes of formula $Al(R_{15}COO)_3$ or $Al(OH)(R_{16}COO)_2$, where $R_{15}$ and $R_{16}$ each independently represent a saturated or unsaturated hydrocarbon functional group with 8 to 18 carbon atoms;

the polymerizable monomer A accounts for 5-20% of the total mass of the effective reactants; the total mass of B and D accounts for 20-75% of the total mass of the effective reactants (A+B+C+D+E), and the mass of B accounts for 5-10% of the total mass of B and D; the total mass of C and E accounts for 20-75% of the total mass of the effective reactants (A+B+C+D+E), and the mass of C accounts for 20-80% of the total mass of C and E (C+E); the ratio of F to G in the organic component E is arbitrary.

2. An application method of the amphiphilic multifunctional hybrid nanoparticle according to claim 1, wherein in a case of preparation of a cementitious material, the hybrid particle is directly added at a time and mixed in a mixing process, and the dosage of the hybrid nanoparticle is 0.1-0.5% of the total mass of cementitious material.

3. A preparation method of an amphiphilic multifunctional hybrid nanoparticle comprises the following steps:
(1) adding water, a first batch of a polymerizable monomer A, a first batch of a non-radical polymerizable siloxane C having hydrophobic hydrocarbon functional groups, and a first batch of a siloxane or organofunctional group substituted siloxane D to a reactor, stirring for fully mixing, adjusting the pH of the mixed solution to 2-10, introducing $N_2$ to the mixed solution to remove $O_2$, and adjusting the temperature of the reaction system to 0-70° C.;
(2) immediately adding an aqueous solution of an initiator to the mixed solution prepared in step (1) or separately adding an initiator and water to initiate polymerization and also uniformly dropwise adding a polymerizable siloxane B, a second batch of the siloxane or organofunctional group substituted siloxane D, a second batch of the non-radical polymerizable siloxane C having hydrophobic hydrocarbon functional groups, and a second batch of the polymerizable monomer A, and reacting for 1-6 hours; and
(3) adding a third batch of non-radical polymerizable siloxane C having a hydrophobic hydrocarbon functional groups and an organic component E to the mixed solution obtained after reaction in step (2), further stirring for 0.5-3 hours, returning the reaction system to room temperature, and adjusting the pH of the mixed solution to 7, thus obtaining a dispersion of the amphiphilic multifunctional hybrid nanoparticle;
wherein the polymerizable monomer A has a double bond at one end to participate in a radical polymerization reaction, and also has a water-soluble chain at the other end, and the polymerizable monomer A is one of or any combination of more than one of structures represented by the following formula (1) and formula (2),

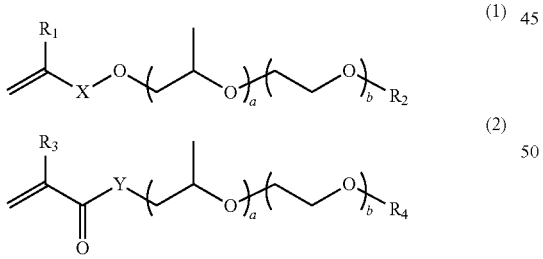

where $R_1$, $R_2$, $R_3$ and $R_4$ each independently represent H or $CH_3$, X represents $-OCH_2CH_2-$, $-OCH_2CH_2CH_2CH_2-$, or saturated alkyl with 1 to 4 carbon atoms, and Y represents $-NH-$ or $-O-$; a and b represent the average molar adduct numbers of ethoxy and isopropoxy in the side chain, respectively, the value of (a+b) ranges from 8 to 114 (8 and 114 are included), and the value of a/(a+b) is not more than ⅓;
the polymerizable siloxane B is any one of or a mixture of more than one of methacryloxypropyltrimethoxysilane (MAPTMS), methacryloxypropyltriethoxysilane (MAPTES), methacryloxymethyltriethoxysilane (AAPTES), acryloyloxymethyltrimethoxysilane (AAMTMS), and acryloxypropyltrimethoxysilane (AAPTMS);
the non-radical polymerizable siloxane C having hydrophobic hydrocarbon functional groups is one of or any combination of more than one of siloxanes having a structure of the following formula (3),

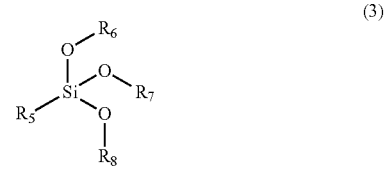

where $R_5$ represents a hydrocarbon functional group with 4 to 22 carbon atoms, $R_6$, $R_7$ and $R_8$ each independently represent saturated alkyl with 1 to 4 carbon atoms, and $R_5$, is a source of hydrophobicity of the particle;
the siloxane or organofunctional group substituted siloxane D is one of or any combination of more than one of siloxanes having a structure of the following general formula (4),

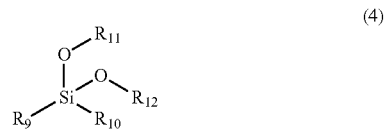

where $R_9$ and $R_{10}$ each independently represent saturated alkyl with 1 to 6 carbon atoms or saturated alkoxy with 1 to 4 carbon atoms, and Ru and Ru each independently represent saturated alkyl with 1 to 4 carbon atoms;
the organic component E is one of or any combination of more than one of saturated or a unsaturated long-chain fatty acid or fatty acid ester F and an aluminum complex G of a saturated or unsaturated aliphatic long-chain fatty acid;
the saturated or unsaturated long-chain fatty acid or fatty acid ester F is one or more than any one of saturated or unsaturated long-chain fatty acid or fatty acid esters having a structure of the following formula (5),

where the functional group $R_{13}$ represents a hydrocarbon functional group with 5 to 21 carbon atoms, and $R_{14}$ represents H or saturated alkyl with 1 to 22 carbon atoms;
the aluminum complex G of the saturated or unsaturated aliphatic long-chain fatty acid is one of or any combination of more than one of aluminum complexes of formula $Al(R_{15}COO)_3$ or $Al(OH)(R_{16}COO)_2$, where $R_{15}$ and $R_{16}$ each independently represent a saturated or unsaturated hydrocarbon functional group with 8 to 18 carbon atoms;
the total mass of effective reactants (A+B+C+D+E) in the reaction system accounts for no more than 30% of the total mass of the reaction system; the polymerizable monomer A accounts for 5-20% of the total mass of the effective reactants; the total mass of B and D accounts for 20-75% of the total mass of the effective reactants (A+B+C+D+E), and the mass of B accounts for 5-10% of the total mass of B and D; the total mass of C and E accounts for 20-75% of the total mass of the effective reactants (A+B+C+D+E), and the mass of C accounts for 20-80% of the total mass of C and E (C+E); the ratio of F to G in the organic component E is arbitrary; the use of water added in the step (1) accounts for 50-90% of the total water consumption of the reaction;

if the polymerizable monomer A of formula (1) is adopted, all the polymerizable monomer A needs to be added at once in the preparation reaction step (1); if the polymerizable monomer A of formula (2) is used, the first batch of the polymerizable monomer A added in step (1) accounts for 0-10% of the total polymerizable monomer A by mass, and the remaining second batch of the polymerizable monomer A needs to be dropwise added uniformly in step (2);

the non-radical polymerizable siloxane C having hydrophobic hydrocarbon functional groups is added to the reaction system in three batches, the first batch of the siloxane C added in the preparation reaction step (1) accounts for 5-25% of the total mass of the siloxane C, and the proportions of the remaining second batch added in the preparation reaction step (2) and the remaining third batch added in the preparation reaction step (3) are arbitrary;

the siloxane or organofunctional group substituted siloxane D is added to the reaction system in two batches; the first batch of the siloxane or organofunctional group substituted siloxane D added in the preparation reaction step (1) accounts for 0-30% of the total mass of D, and the remaining second batch of D is dropwise added uniformly in the preparation reaction step (2), wherein the amphiphilic multifunctional hybrid nanoparticle having a detachable hydrophilic organic polymer with both a water-soluble chain and a hydrophobic hydrocarbon functional group attached to the surface, wherein the body of the nanoparticle is a silica or an organofunctional group substituted silicon dioxide or an organofunctional group substituted silicon-oxygen bond network, and the nanoparticle contains a free organosiloxane with hydrophobic long hydrocarbon functional groups and a fatty acid or fatty acid ester or fatty acid aluminum complex with hydrophobic long hydrocarbon functional groups;

the nanoparticle has an average diameter of not more than 1000 nm.

4. The preparation method of the amphiphilic multifunctional hybrid nanoparticle according to claim 3, wherein the initiator is a thermal initiator or a redox initiator, and the dosage of the initiator is calculated based on the following method: if the initiator is a thermal initiator, the mass of the initiator is 0.4-4% of the total mass of the polymerizable monomer A and the polymerizable siloxane B; if the initiator is a redox initiator, the mass of an oxidizing agent and the mass of a reducing agent are each 0.1-4% of the total mass of the polymerizable monomer A and the polymerizable siloxane B.

5. The preparation method of the amphiphilic multifunctional hybrid nanoparticle according to claim 4, wherein the thermal initiator includes azobisisobutyrazoline hydrochloride (VA044), azobisisobutylphosphonium hydrochloride (V50), benzoyl peroxide, azobisisobutyronitrile (AIBN); and the redox initiator is composed of an oxidizing agent and a reducing agent, wherein the oxidizing agent includes hydrogen peroxide, ammonium persulfate and potassium persulfate, and the reducing agent includes ascorbic acid, sodium hydrogen sulfite and rongalite.

\* \* \* \* \*